United States Patent
Harm

[19]

[11] Patent Number: 6,109,428

[45] Date of Patent: Aug. 29, 2000

[54] BELT LIFTING APPARATUS

[76] Inventor: Gary Clive Harm, 2 Logue Court, South Hedland, Australia

[21] Appl. No.: 09/125,503

[22] PCT Filed: Feb. 18, 1997

[86] PCT No.: PCT/AU97/00095

§ 371 Date: Aug. 19, 1998

§ 102(e) Date: Aug. 19, 1998

[87] PCT Pub. No.: WO97/30927

PCT Pub. Date: Aug. 28, 1997

[30] Foreign Application Priority Data

Feb. 20, 1996 [AU] Australia ..................... 8164

[51] Int. Cl.⁷ .................................... B65G 15/60
[52] U.S. Cl. ................ 198/841; 198/842; 198/866
[58] Field of Search ................. 198/841, 842, 198/866

[56] References Cited

U.S. PATENT DOCUMENTS

| | | | |
|---|---|---|---|
| 2,904,166 | 9/1959 | Stinson | 198/842 |
| 3,211,277 | 10/1965 | Knapp et al. | 198/842 |
| 4,007,827 | 2/1977 | Mattos | 198/842 |
| 4,513,859 | 4/1985 | Long et al. | 198/842 |
| 4,678,075 | 7/1987 | Bowman, Jr. . | |
| 4,978,000 | 12/1990 | Mohr | 198/842 |

FOREIGN PATENT DOCUMENTS

| | | |
|---|---|---|
| 18056/62 | 11/1963 | Australia . |
| 4796/61 | 11/1963 | Australia . |
| 46476/64 | 1/1966 | Australia . |
| 73862/81 | 2/1982 | Australia . |
| 76305/81 | 4/1982 | Australia . |
| 85498/82 | 1/1983 | Australia . |
| 60724/86 | 4/1987 | Australia . |
| 69927/87 | 9/1988 | Australia . |
| 580705 | 1/1989 | Australia . |
| 0 270 142 | 6/1988 | European Pat. Off. . |
| 2 259 781 | 8/1975 | France . |
| 44 30 159 | 2/1996 | Germany . |
| 7711605 | 4/1979 | Netherlands . |

*Primary Examiner*—Joseph E. Valenza
*Attorney, Agent, or Firm*—Merchant & Gould P.C.

[57] ABSTRACT

A lifting apparatus (10) for lifting an endless conveyor belt (11) supported on a support frame structure (15) including two spaced apart frame members (33). The lifting apparatus (10) comprises a lower beam member (57) for extending between and resting on the two frame members (33) and an upper beam member (53) for engaging a section of the conveyor belt (11) to be lifted. A jack means (59) is operable between the two beam members (53, 57) for selectively moving the two members towards and away from each other between extended and contracted conditions. The jack means (59) comprises two telescopic rams (61) disposed to extend outwardly of the two beam members (53, 57) when in the contracted condition. This allows the two beam members (53, 57) to assume a compact arrangement when in the contracted condition.

12 Claims, 10 Drawing Sheets

BELT LIFTING APPARATUS

TECHNICAL FIELD

This invention relates to a belt lifting apparatus, and more particularly to a lifting device for lifting a section of a belt of an endless belt conveyor.

BACKGROUND TO THE INVENTION

In an endless belt conveyor, a conveyor belt passes around end rollers and is supported therebetween on idler rollers. The endless belt normally includes a load-carrying run and a return run. Typically, the load-carrying run is of a trough formation and the supporting idler rollers are arranged in a troughing formation. The endless belt conveyor normally includes a frame structure including two spaced apart longitudinal frame members (commonly known as stringers). The idler rollers are carried on frames which extend between and which are attached to the stringers.

It is on occasions necessary to lift a section of the endless belt This is usually necessary when access is required to an idler roller, or a bank of idler rollers, for servicing, repair or replacement.

Various lifting arrangements have been used for lifting the belt clear of an idler roller. These lifting arrangements include use of a lever, such as a length of wood or crow bar, for levering a section of the belt upwardly clear of a particular idler roller, or use of a hoisting system. Lever systems and hoisting systems are not always convenient to use as they can be difficult to set up and use in confined locations.

Australian Patent No. 580705 discusses a belt lifting device which comprises a top beam for location below, and across, a section of belt to be lifted and a base beam adapted to be placed across, and supported by, lateral frame members located on the longitudinal sides of the conveyor belt. A jack mechanism is provided between the top beam and the base beam, the arrangement being such that operation of the jack mechanism can raise the top beam relative to the base beam thereby to lift the section of belt above the top beam. The jack mechanism is in the form of a scissor jack accommodated between the two beams. Because of the location of the scissor jack, the extent to which the top and base beams can be drawn together to provide a compact arrangement when the device is in a retracted condition is limited. This limitation in compactness can be disadvantageous for storage and transportation, particularly so when the lifting device needs to be carried manually to A location at which it is to be used. Furthermore, the limitation in compactness can present difficulties in circumstances where there is restricted space within the conveyor frame structure in the region below the belt to accommodate the lifting device.

SUMMARY OF THE INVENTION

The present invention seeks to provide a simple yet highly effective lifting apparatus which in a preferred arrangement is relatively compact when in a contracted condition.

The invention provides a lifting apparatus for lifting an endless conveyor belt supported on a support frame structure including two spaced apart frame members, the lifting apparatus comprising a lower member for extending between and resting on the two frame members, an upper member for engaging a section of the conveyor belt to be lifted, and jack means operable between the upper and lower members for selectively moving the two members towards and away from each other between extended and contracted conditions, said jack means comprising a telescopic ram disposed to extend outwardly of the upper and lower members when in the contracted condition.

With this arrangement, there is no need for a space between the upper an lower members when in the retracted condition to accommodate the telescopic ram.

Preferably, the telescopic ram comprises a hydraulic ram having a cylinder portion and a piston portion. Conveniently, the cylinder portion is connected to the lower member and depends therefrom, and the piston portion is connected to the upper member.

In a preferred arrangement, there are two telescopic rams, with one ram positioned adjacent each common end of the upper and lower members.

The spacing between the two telescopic rams is preferably such that the rams can be disposed outwardly of the two frame members on which in use the lower member rests.

The upper member may be connected to each telescopic ram for pivotal movement about an axis which in use is generally parallel to the longitudinal extent of the section of the belt being lifted. With this arrangement, the upper member can tilt to accommodate any difference in the rate of extension or contraction of the telescopic rams.

Where a section of the load-carrying run of the endless belt to be lifted, the upper member may engage directly against the underside of the load-carrying run of the belt or it may be provided with a cradle or other engaging arrangement for engaging the underside of the load-carrying of the belt.

Where a section of the return run of the belt is required to be lifted, an ancillary lifting attachment may be provided for this purpose. The ancillary lifting attachment may depend from the upper member for engagement with the return of the belt thereby to lift the section of the return run of the belt upon raising of the upper member.

The ancillary lifting attachment may comprise an ancillary lifting beam adapted to be located on the underside of the return run of the conveyor belt and coupled to the upper member whereby upward movement of the upper member away from the lower member effects upward movement of the ancillary lifting beam and hence lifting of the return run of the conveyor belt.

The ancillary lifting beam may be coupled to the upper member of the lifting device in any suitable fashion such as by way of a lifting chain at each end of the ancillary lifting beam.

The lifting apparatus according to the invention may further comprise a lifting sling device for lifting a roller from its support after the belt supported on the roller has been lifted. The sling device may comprise a sling chain adapted to be connected at its ends to the upper member of the lifting device in a manner so as to drape loosely underneath the respective roller. With this arrangement, the sling chain does not engage the roller until such time as the portion of the belt supported thereon has been lifted. Thereafter on continued upward movement of the upper member, the sling chain engages the underside of the roller and applies lift thereto.

BRIEF DESCRIPTION OF THE DRAWINGS

The invention will be better understood by reference to the following description of several specific embodiments thereof as shown in the accompanying drawings in which.

DESCRIPTION OF PREFERRED EMBODIMENTS

Figure 1:
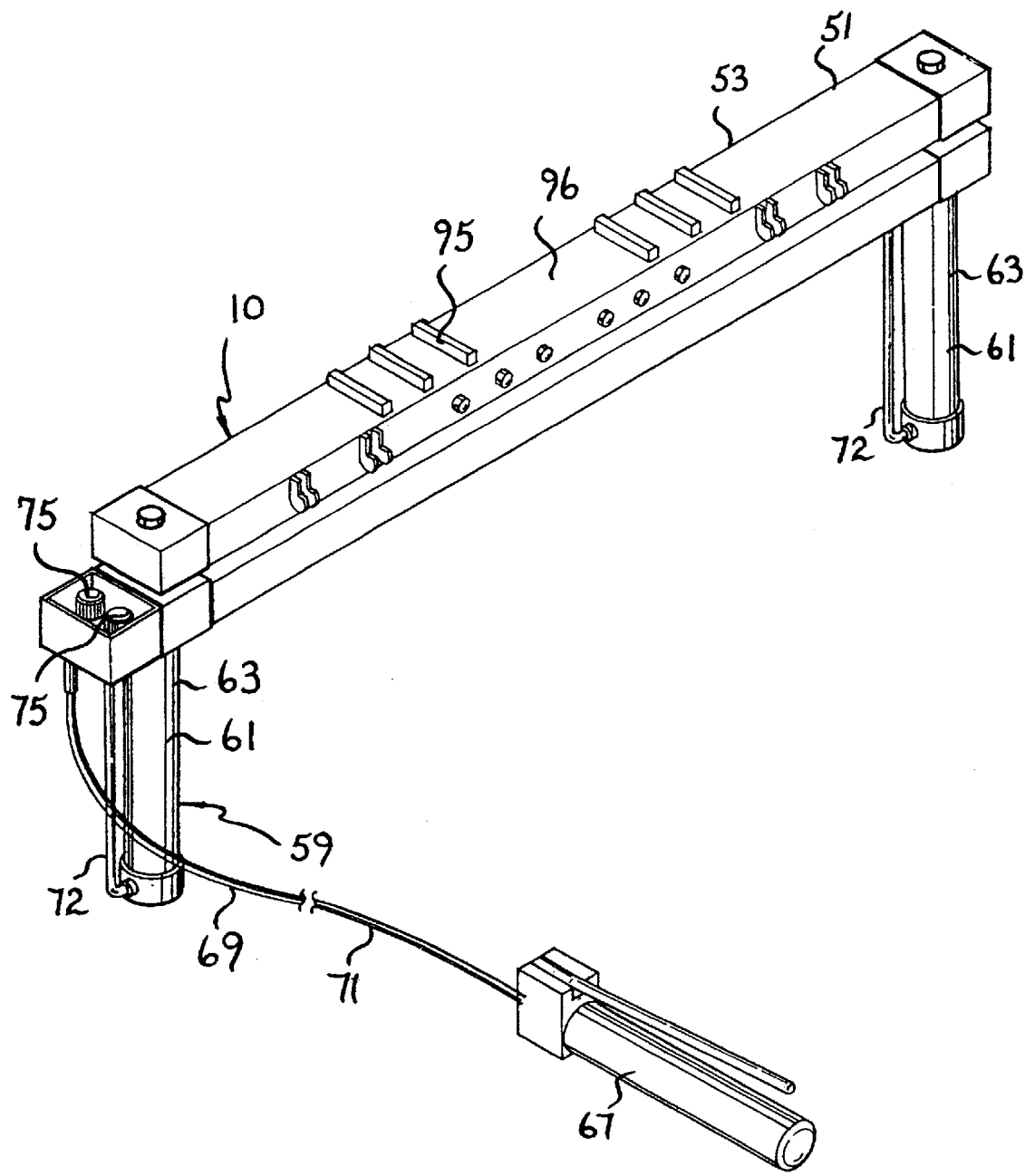
FIG. 1 is a perspective view of a belt lifting apparatus according to a first embodiment shown in a retracted condition.
Figure 2:
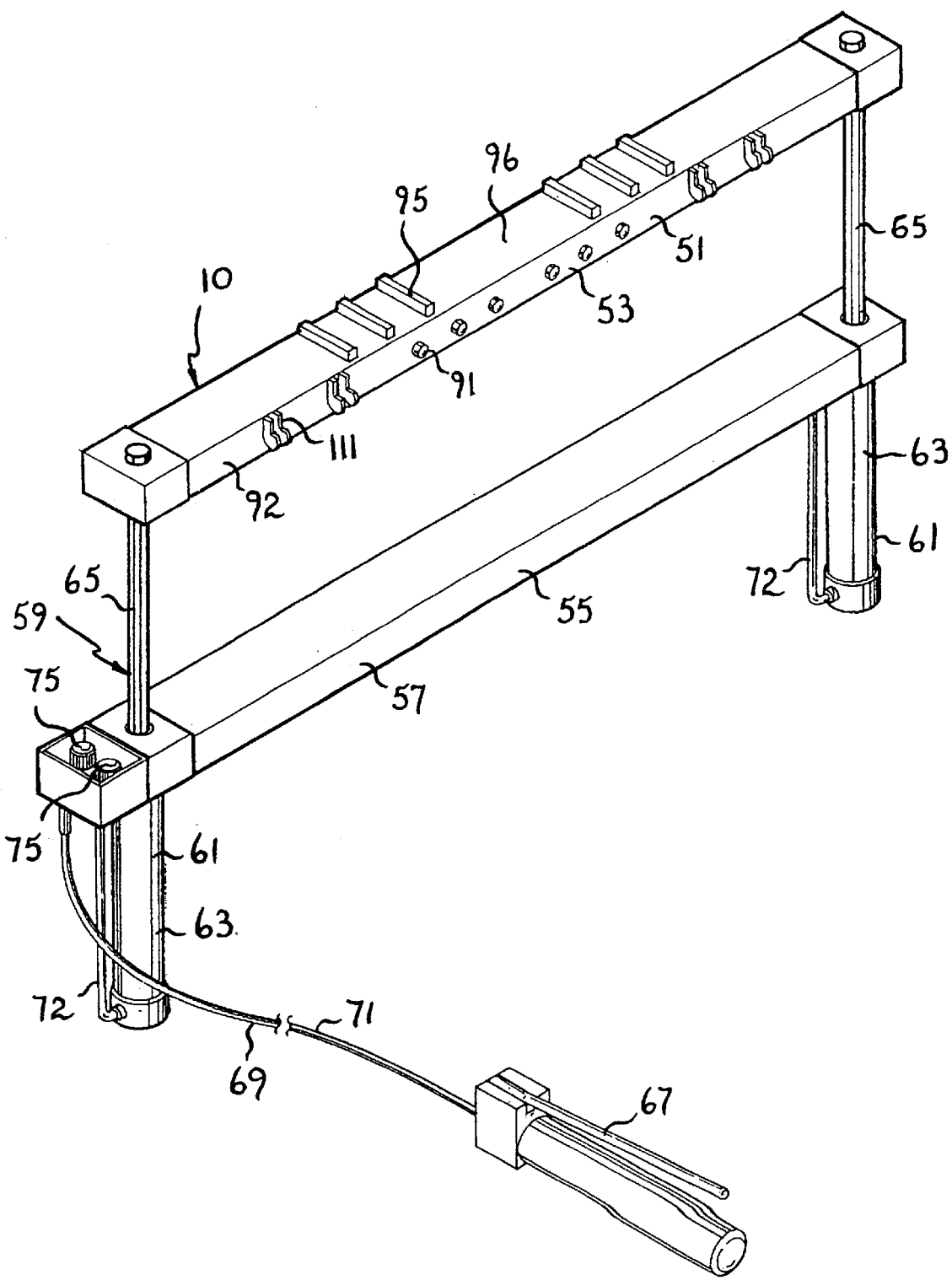
FIG. 2 is a view similar to FIG. 1 except that the belt lifting apparatus is shown in an extended condition.

Referring to the drawings, the lifting apparatus 10 according to the embodiment has been devised for lifting an endless conveyor belt 11 of a belt conveyor 13.

The belt conveyor 13 comprises a frame structure 15 which supports head and tail rollers (not shown) about which the endless belt 11 travels. The endless belt 11 has an upper load-carrying run 17 and a lower return run 19 between the head and tail rollers.

The upper, load-carrying run 17 is supported at intervals along its length by idler rollers 21. In this embodiment, the idler rollers 21 include a flat idler roller 23 at one section of the load-carrying run 17 and banks 25 of idler rollers 26 at other sections of the load-carrying run. Each bank 25 of idler rollers 26 comprises a central roller 27 and two lateral rollers 29 arranged in a troughing formation, as is conventional practice.

The lower, return run 19 is supported at intervals along its length by return idler rollers 31.

The frame structure 15 includes two elongate frame elements 33 which extend longitudinally with respect to the endless belt 11 and which are commonly referred to as stringers. Upper mounting brackets 35 are mounted between the stringers 33 for rotatably supporting the upper idler rollers 21. Similarly, lower mounting brackets 37 are mounted on, and depend from, the stringers 33 for rotatably supporting the return idler rollers 31. The lower mounting brackets 37 each include a pair of opposed end supports 39 for supporting the ends of an axle 41 of the respective return idler roller 31. The end supports 39 each includes a slot 43 open at its upper end to receive and support the end of the respective axle 41. This arrangement allows each return idler roller 31 to be lifted from the particular end supports 39 in which it is supported for the purpose of servicing, repair or replacement.

The belt lifting apparatus 10 according to the embodiment includes an upper member 51 comprising a lifting beam 53 and a lower member 55 comprising a base beam 57. The lifting beam 53 and the base beam 57 are positioned in side-by-side relation and are movable towards and away from each other between extended and contracted conditions under the influence of a jacking mechanism 59 operating between them.

The jacking mechanism 59 includes two hydraulically operable telescopic rams 61 extending respectively between adjacent ends of the two beams 53, 57. Each hydraulic ram 61 comprises a cylinder portion 63 which is rigidly attached to the base beam 57 and extends downwardly on the underside thereof. The hydraulic ram 61 further comprises a piston portion 65 which extends between the two beams 53, 57 and which is rigidly attached at its upper end to the lifting beam 53.

With the cylinder portion 63 depending from the base beam 57 in the manner shown in the drawings, there is no need for a space between the two beams 53, 57 when in the retracted condition to accommodate the hydraulic rams 61. In other words, the telescopic rams 61 do not obstruct relative movement of the two beams 53, 57 into a retracted condition in which they are closely adjacent each other, as shown in FIG. 1.

The two hydraulic rams 61 are operably connected to a manually-operable hydraulic pump 67 by way of a hydraulic circuit 69. The hydraulic circuit 69 includes a common hydraulic fluid line 71 and two branch line 72, 73 each connected to one of the hydraulic rams 61. Each branch line 72, 73 communicates with the common line 71 by way of a respective regulating valve 75. The two regulating valves 75 provide a means for regulating delivery of hydraulic fluid to, and withdrawal of hydraulic fluid from, each of the two hydraulic rams 61 at an equal rate even in circumstances where there is disparity in loadings on them. This regulation is for the purpose of achieving a condition in which the two hydraulic rams 61 extend and contract at equal rates and so maintain the two beams 53, 57 in parallel relation.

The two regulating valves 75 are located in a housing at one end of the base beam 57. The branch line 72 extending to the remote hydraulic ram 61 extends through the interior of the base beam 57.

Figure 3:
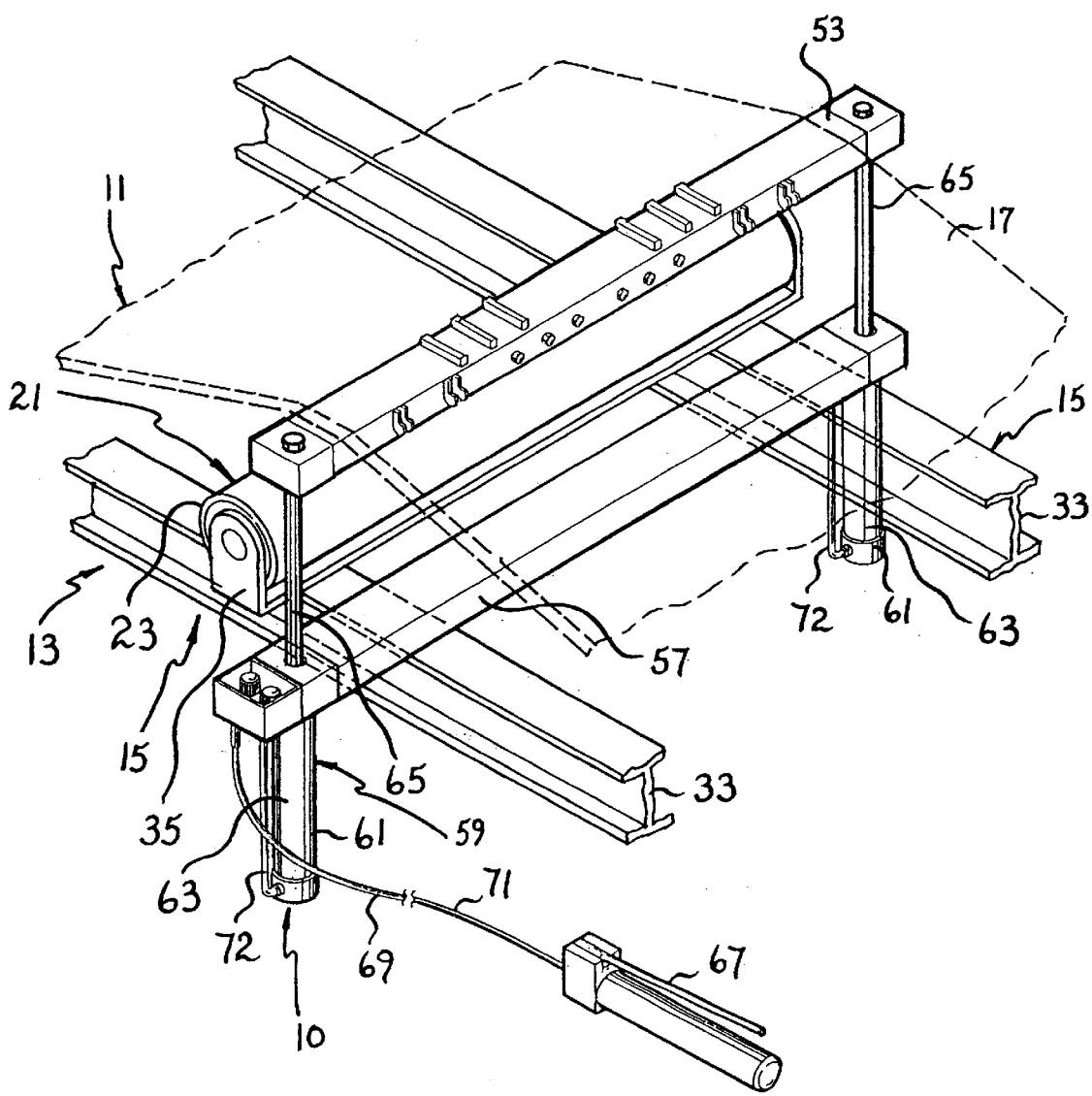
FIG. 3 is a schematic perspective view showing the belt lifting apparatus lifting a section of a load-carrying run of an endless belt away from a straight supporting idler roller.

The belt lifting apparatus 10 according to the embodiment can be used to lift a section of the upper run 17 of the endless belt 11 from the idler roller 23 or from any one of the banks 25 of troughing rollers 26. This is illustrated in FIG. 3 of the drawings where the lifting apparatus 11 is shown lifting the upper run 17 of the endless belt 11 from the idler roller 23, and in FIG. 4 where the lifting apparatus 11 is shown lifting the upper run 17 of the endless belt 11 from one of the banks 25 of troughing rollers 26. In each case, the load-carrying run 17 of the endless belt is lifted to allow access to the idler roller, or bank of idler rollers, therebelow to allow access for servicing, repair or replacement.

Figure 4:
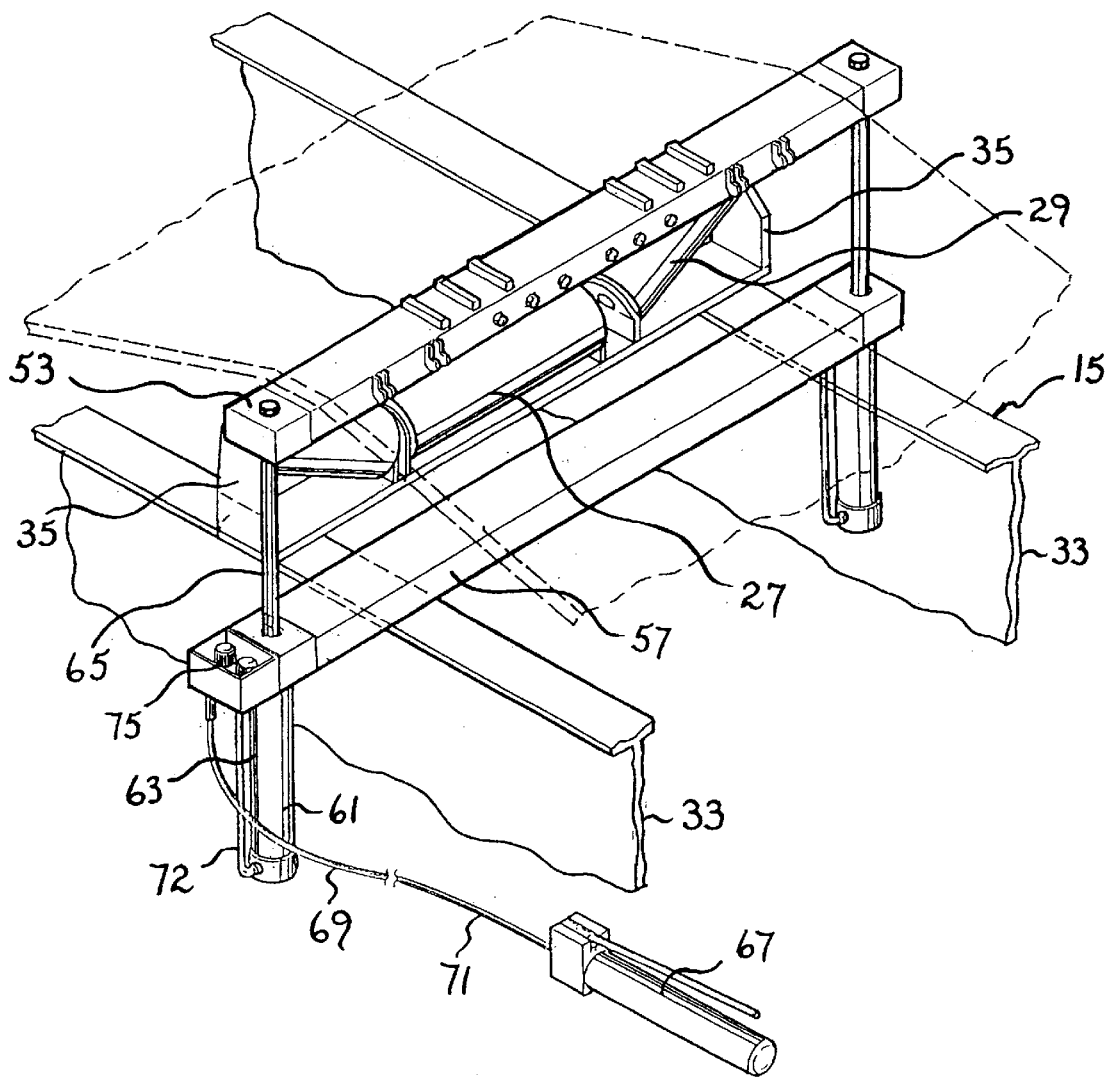
FIG. 4 is a schematic perspective view showing the belt lifting apparatus lifting a section of the load-carrying run of the endless belt away from a bank of idler rollers arranged in a troughing formation.

To use the belt lifting apparatus 10 in the fashion shown in FIGS. 3 and 4 of the drawings, the lifting beam 53 and the base beam 57 are first arranged in the position shown in FIG. 1 of the drawings where the hydraulic rams 61 are in the retracted condition such that the two beams are closely adjacent each other. The two beams 53, 57 are then positioned between the stringers 33 and the load-carrying run 17 of the conveyor belt adjacent the particular roller, or bank of rollers, from which the load-carrying run is to be lifted. The lifting apparatus 11 is so positioned that the base beam 57 extends between, and rests on the two stringers 33, with the hydraulic rams 61 disposed on the outside of the two stringers, as shown in the drawings. With this arrangement, operation of the hydraulic pump 67 causes the hydraulic rams 61 to extend and thereby move the lifting beam 53 upwardly away from the base beam 57 and into engagement with the underside of the load-carrying run 17 of the endless belt 11. Continued upward movement of the lifting beam 53 lifts the section of the load-carrying run 17 of the endless belt upwardly out of engagement with the particular roller or bank of rollers, so as to allow access thereto. Once work on the roller, or bank of rollers, has been completed, the hydraulic ram 61 can be retracted thereby allowing the lifting beam 53 to move downwardly and return the load-carrying run 17 of the endless belt into position on the roller, or bank of rollers. The lifting apparatus 10 can then be removed from the belt conveyor.

This arrangement provides a simple yet highly effective lifting apparatus 10 for lifting the upper run of an endless belt of a belt conveyor. The lifting apparatus 10 is simple to install into position for performing a lifting operation, and to remove after the lifting operation. It is merely necessary for the base beam 57 to be positioned so that it extends between, and supported on, the stringers 33 of the frame structure 15 of the belt conveyor. The feature whereby the two beams 53, 67 can assume a contracted condition in which they are closely adjacent each other (as shown in FIG. 1) provides a compact structure which is convenient to carry on site and which can be installed in many confined situations.

Figure 5:
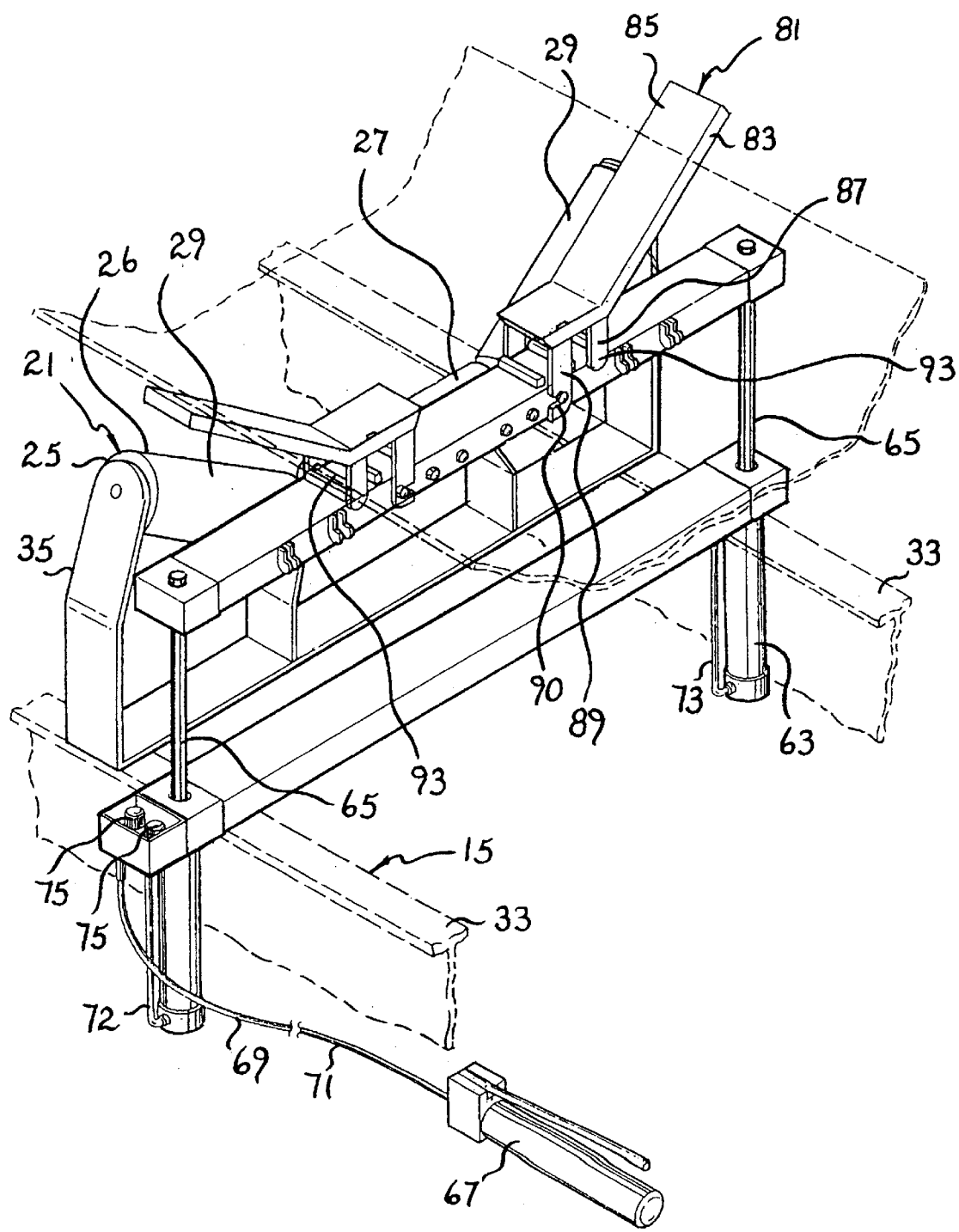
FIG. 5 is a view similar to FIG. 4 except that the apparatus is shown fitted with a detachable lifting cradle for supporting the trough formation of the belt during the lifting operation.

There may be situations where it is desirable to support the upper run 17 of the endless belt 11 in its troughing formation during the lifting operation. For this purpose, the apparatus 10 may be provided with a detachable lifting cradle 81, as shown in FIG. 5 of the drawings. The lifting cradle 81 Comprises two cradle sections 83 each having a surface 85 for supporting the underside of the load carrying run 17 of the endless conveyor belt. Each cradle section 83 is provided with attachment means 87 for releasable attachment to the lifting beam 53. The attachment means 87 comprises a pair of spaced apart attachment brackets 89 each having an attachment slot 90 to receive one of a series of attachment pins 91 provided on the side faces 92 of the lifting beam 53. The attachment means 87 further comprises a heel portion 93 which bears against one of a series of attachment lugs 95 provided on the top face 96 of the lifting beam. There are a series of attachment pins 91 and attachment lugs 95 provided on the lifting beam 53 to allow selective positioning of the cradle sections 81 onto the lifting beam according to the width of the return run of the belt. The attachment means 87 allows the cradle sections 83 to be easily installed into position on, and removed from, the lifting beam as required.

Figure 6:
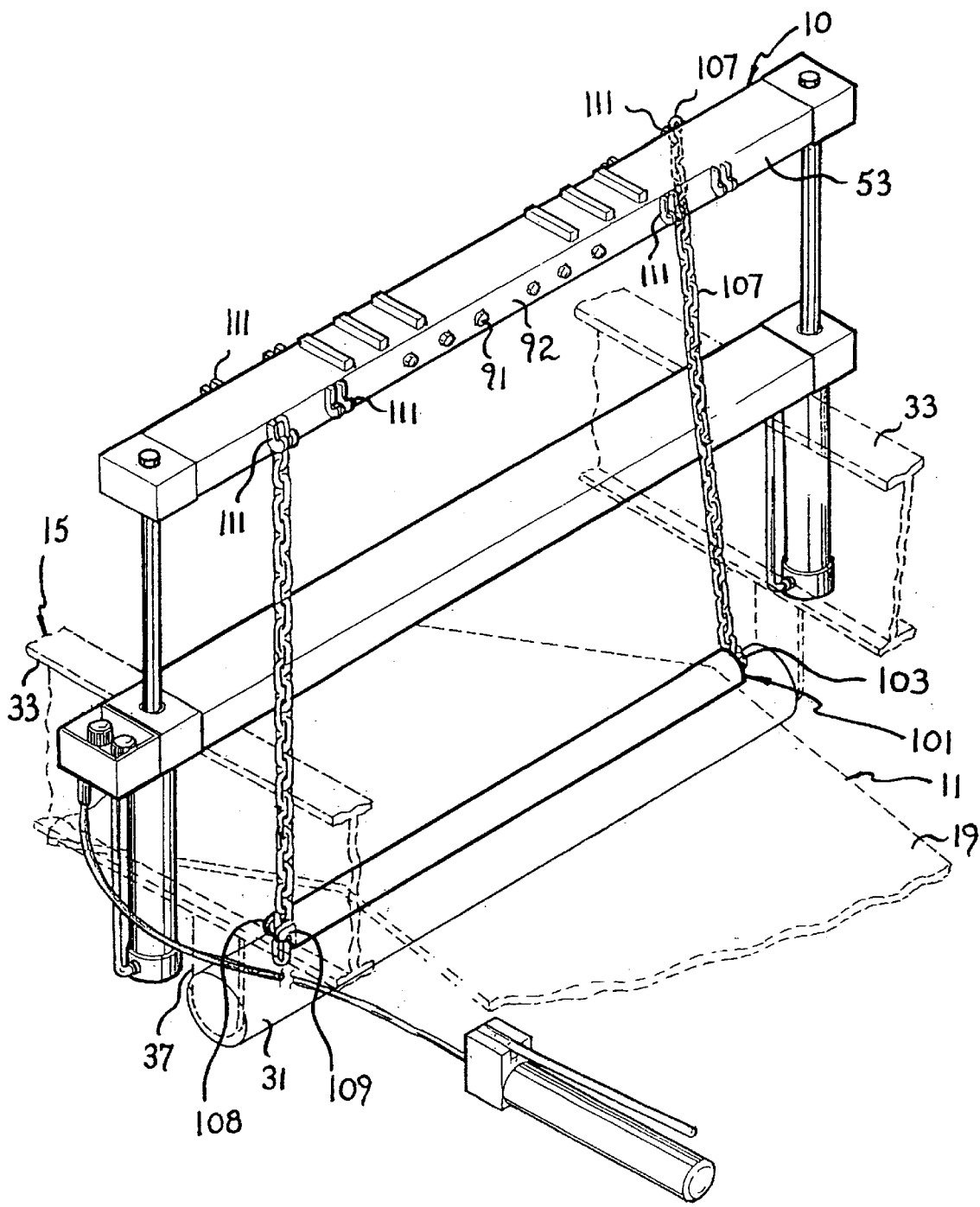
FIG. 6 is a schematic perspective view showing the belt lifting apparatus fitted with an ancillary lifting attachment for lifting a section of the return run of the endless belt from a return idler roller.
Figure 7:
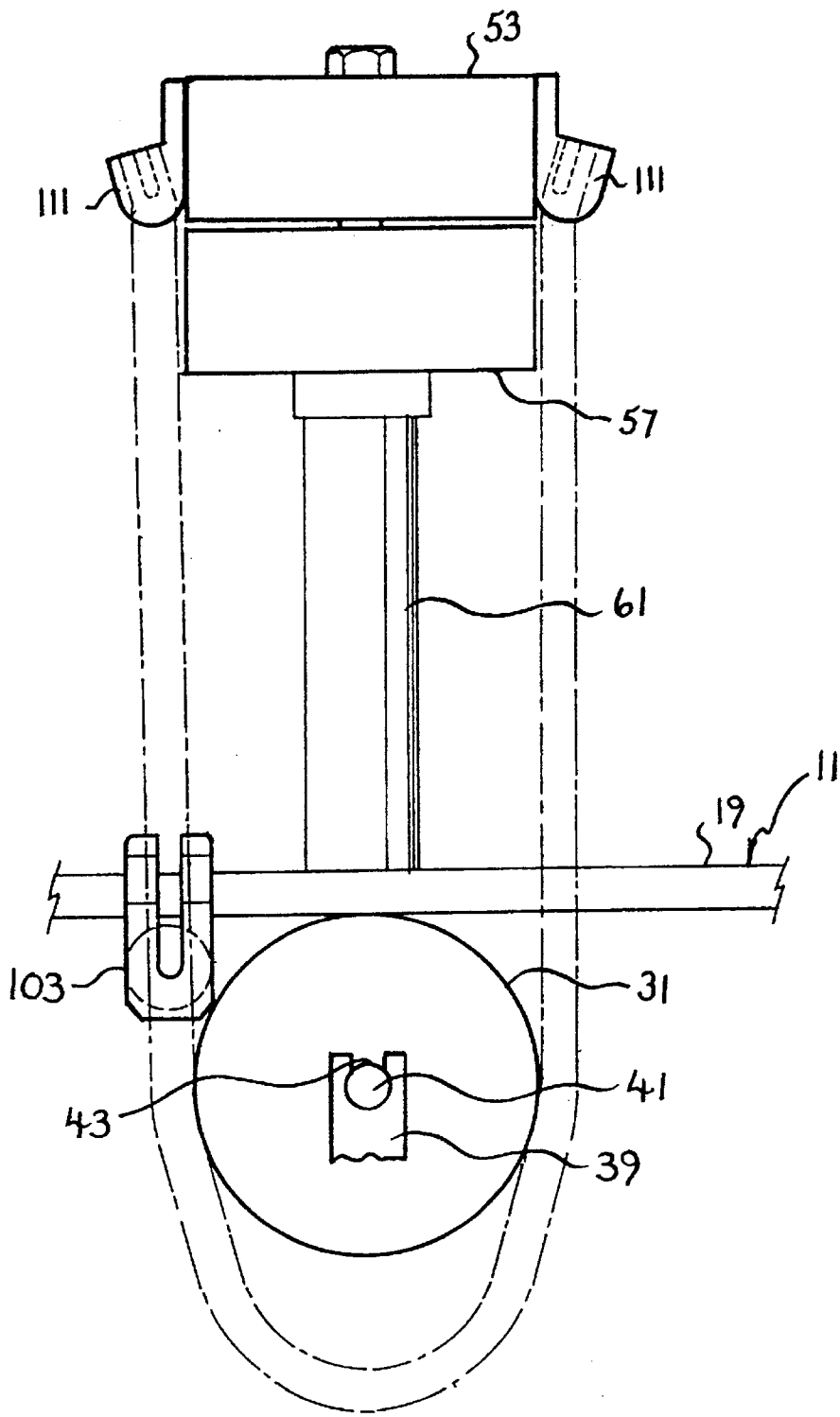
FIG. 7 is a fragmentary side view of the arrangement shown in FIG. 6 incorporating a lifting sling device for also lifting the return roller, the lifting sling means being shown in a condition prior to engagement with the return idler roller to effect lifting thereof.
Figure 8:
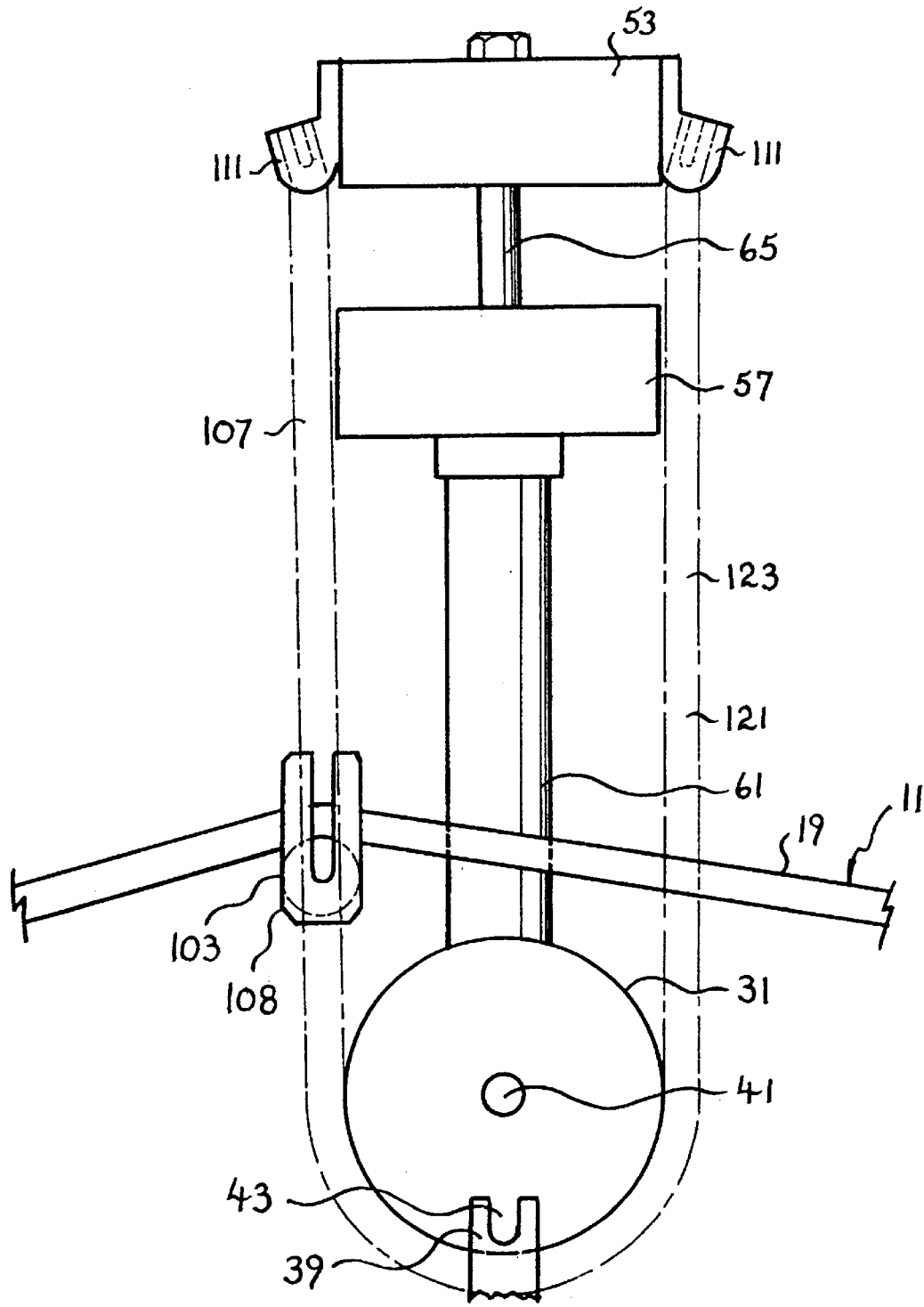
FIG. 8 is a view similar to FIG. 7 except that the lifting sting device is shown in engagement with the return idler roller.

The lifting apparatus according to the embodiment is also provided with an ancillary lifting attachment 101 for lifting a section of the return run 19 of the endless belt from a return roller 31, as shown in FIG. 6, 7 and 8 of the drawings. The ancillary lifting attachment is releasably attachable to the lifting beam 53 and comprises an ancillary lifting beam 103 adapted to be positioned on the underside of the return run 19 of the belt 11. The lifting beams 103 may be available in various lengths to accommodate a range of widths of conveyor belt. The ends of the ancillary lifting beam 103 are detachably connected to the lifting beam 53 by way of detachable lifting chains 107. Each end of the ancillary lifting beam 103 is provided with a connector 108 incorporating a lug 109 for engagement with the respective lifting chain 107. The upper end of each lifting chain 107 is engagable with one of a series of lifting lugs 111 provided on the side faces 92 of the lifting beam 53. The lifting beam 53 is provided with the series of lifting lugs 111 to accommodate various sizes of ancillary lifting beams 103. The lifting lugs 111 are provided on opposed side faces 92 of the lifting bean 53 so that the attachment chain 107 at one end of the ancillary lifting beam 103 can be attached to one of the lifting lugs 111 on one side face of the lifting beam and the attachment chain 107 at the other end of the ancillary lifting beam can be attached to one of the lifting lugs 111 on the other side face of the lifting beam. This arrangement ensures that the ancillary lifting beam 103 is supported in a stable fashion.

When the ancillary lifting beam 103 is coupled to the lifting beam 53 by way of the attachment chains 107, upward movement of the lifting beam 53 is transferred to the ancillary lifting beam 103 by way of the attachment chains 107 and in this way the lower run 19 of the conveyor belt is lifted from the return roller 31 to allow access thereto for servicing, repair or replacement.

In addition to lifting the return run 19 of the belt, the apparatus according to the embodiment may also be used to lift the return roller 31 from its mounting bracket 37.

For this purpose, a lifting sling device 121 may be provided. The lifting sling device 121 comprises two sling chains 123 each extending around the underside of a respective end section of the return roller 31. Each sling chain 123 has one end thereof engaged with one of the lifting lugs 111 on the lifting beam 53 and the other end thereof engaged with the connector 108 on the respective end of the ancillary lifting beam 103. Each sling chain 123 is of a length so that it drapes loosely below the return roller 31 (as shown in FIG. 7) and does not engage the roller 31 to provide lift thereto until such time as the return run 19 of the endless belt has been lifted clear of the roller. Thereafter, on continued upward movement of the lifting beam 53, the sling chains 123 engage the underside of the roller 31 and then lift the roller out of the supports 39 of the mounting bracket 37, as shown in FIG. 8 of the drawings.

The first embodiment is directed to a belt lifting apparatus 10 which incorporates a hydraulic circuit 69 having regulating valves 75 to ensure that the hydraulic rams 61 extend and contract at equal rates so as to maintain parallel relation between the two beams 53, 57.

Figure 9:
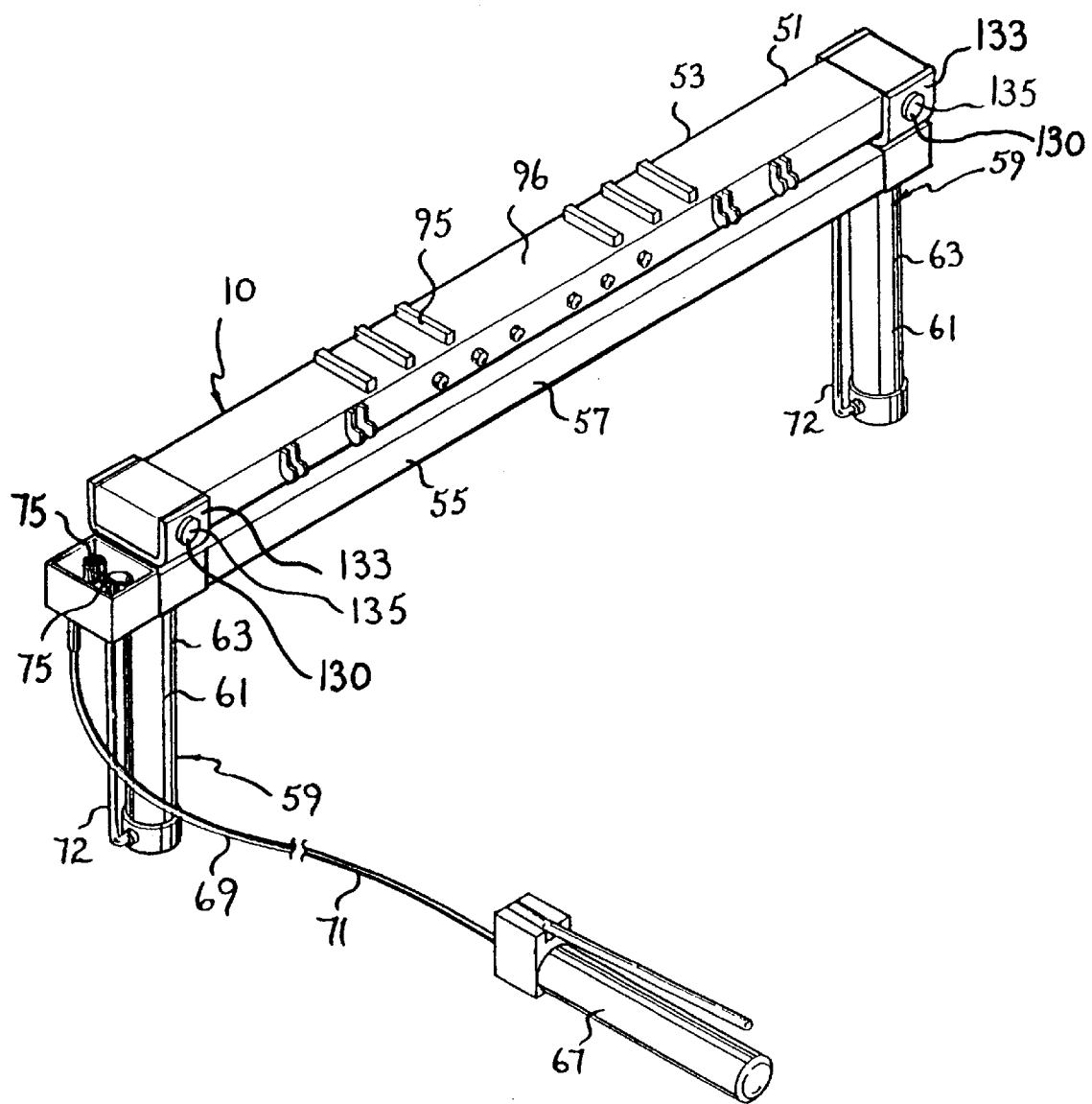
FIG. 9 is a perspective view of a belt lifting apparatus according to a second embodiment shown in a retracted condition.
Figure 10:
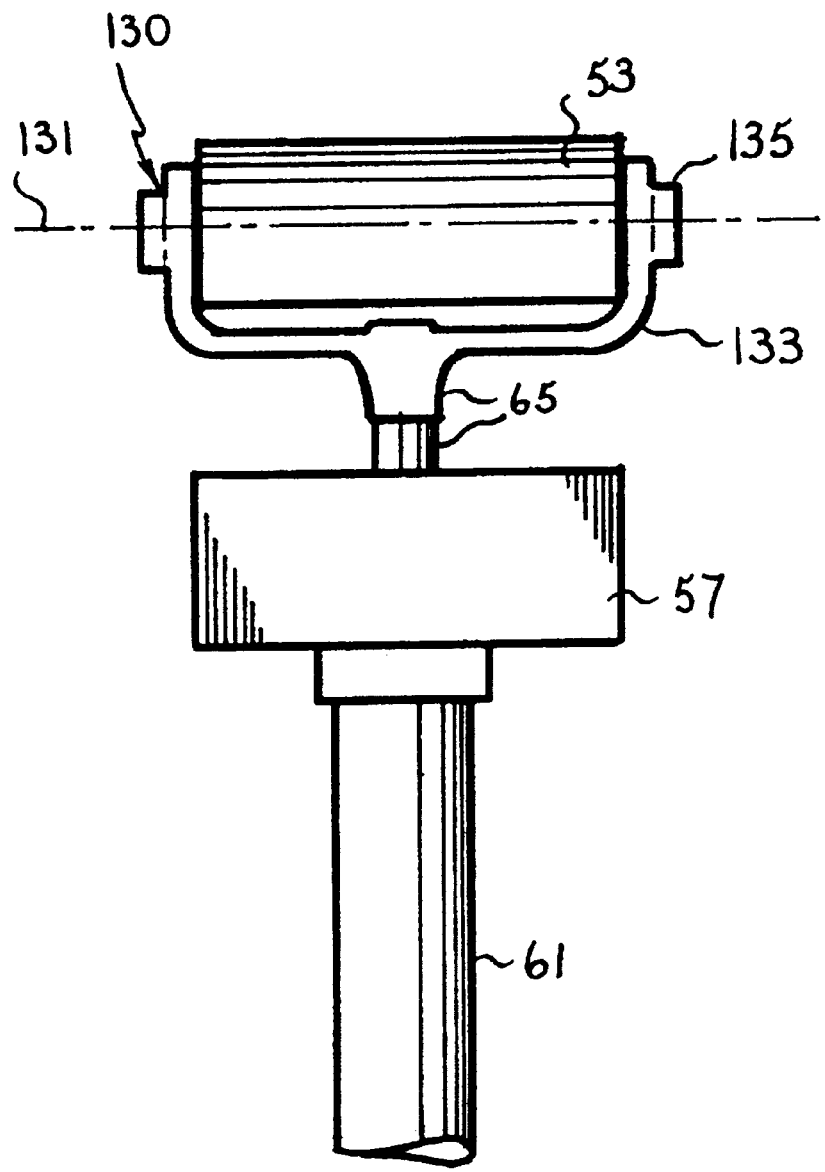
FIG. 10 is an end view of the belt lifting apparatus of FIG. 9, shown in a partly extended condition.

A second embodiment, which is shown in FIGS. 9 and 10 of the drawings, is directed to a belt lifting apparatus which is somewhat similar to the first embodiment with the exception that the upper beam 57 is not rigidly fixed to each hydraulic ram 61 but rather is connected thereto at 130 for pivotal movement about a transverse pivot axis 131 which (in use of the lifting apparatus) is generally parallel to the longitudinal extent of the section of the conveyor belt being lifted.

The pivotal connection at 130 is provided by a yoke 133 fixed on the upper end of the piston portion 65 of each respective hydraulic ram 61. The yoke 133 carries the ends of a pivot pin 135 which supports the respective end of the upper beam 53 for pivotal movement about the pivot axis 131.

The pivotal connections 130 between the upper beam 53 and the hydraulic rams 61 allows the upper beam 53 to tilt about its ends to accommodate any lateral misalignment of the conveyor belt arising from, for example, off-centre loading on the conveyor belt.

The pivotal connections 131 also assist in avoiding problems which might otherwise arise if the hydraulic rams 61 do not extend and contract at the same rate. While the regulating valves 75 are provided to allow hydraulic fluid flow rates to be adjusted to operate the hydraulic rams 61 in unison, this in practice can sometimes be difficult to achieve, if the hydraulic rams 61 do not extend and contract in unison, they are susceptible to damage if fixed to the upper beam 53. The pivotal connections 130 avoid such problems.

From the foregoing, it is evident that the present embodiments each provide a simple yet highly effective lifting apparatus that can lift both the load carrying and the return runs of an endless belt from their respective idler rollers, as well as having facility to lift the return rollers from their installed positions.

It should be appreciated that the scope of the invention is not limited to the scope of the embodiments described.

What is claimed is:

1. A lifting apparatus for lifting an endless conveyor belt supported on a support frame structure including two spaced apart frame members, the lifting apparatus comprising a lower member for extending between and resting on the two frame members, an upper member for engaging a section of the conveyor belt to be lifted, and jack means operable between the upper and lower members for selectively moving the two members towards and away from each other between extended and contracted conditions, said jack means comprising a telescopic ram disposed to extend outwardly of the upper and lower members when in the contracted condition.

2. A lifting apparatus according to claim 1 wherein the telescopic ram comprises a hydraulic ram having a cylinder portion and a piston portion.

3. A lifting apparatus according to claim 2 wherein the cylinder portion is connected to the lower member and depends therefrom, and the piston portion is connected to the upper member.

4. A lifting apparatus according to claim 1, wherein there are two telescopic rams, with one ram positioned adjacent each common end of the upper and lower members.

5. A lifting apparatus according to claim 4 wherein the spacing between the two telescopic rams is such that the rams can be disposed outwardly of the two frame members on which in use the lower member rests.

6. A lifting apparatus according to claim 1 wherein the upper member is connected to each telescopic ram for pivotal movement about an axis which in use is generally parallel to the longitudinal extent of the section of the belt being lifted.

7. A lifting apparatus according to claim 1 wherein the upper member is adapted to receive a cradle far engaging the underside of the load-carrying of the belt.

8. A lifting apparatus according to claim 1 further comprising an ancillary lifting attachment for lifting a section of the return run of the belt.

9. A lifting apparatus according to claim 8 wherein the lifting attachment depends from the upper member for engagement with the return of the belt thereby to lift the section of the return run of the belt upon raising of the upper member.

10. A lifting apparatus according to claim 8 wherein the ancillary lifting attachment comprises an ancillary lifting beam adapted to be located on the underside of the return run of the conveyor belt and coupled to the upper member whereby upward movement of the upper member away from the lower member effects upward movement of the ancillary lifting beam and hence lifting of the return run of the conveyor belt.

11. A lifting apparatus according to claim 1 further comprising a lifting sling device for lifting a roller from its support after the belt supported on the roller has been lifted.

12. A lifting apparatus according to claim 11 wherein the sling device comprises a sling chain adapted to be connected at its ends to the upper member of the lifting device in a manner so as to drape loosely underneath the respective roller.

* * * * *